US012704231B2

(12) United States Patent
Büchner et al.

(10) Patent No.: US 12,704,231 B2
(45) Date of Patent: Aug. 11, 2026

(54) ILLUMINATION DEVICE FOR A VEHICLE

(71) Applicant: Hella GmbH & Co. KGaA, Lippstadt (DE)

(72) Inventors: Arnd-Claus Büchner, Lippstadt (DE); Julia Böning, Lippstadt (DE); Wolf Alexander Quitsch, Beckum (DE); Peter Rausch, Münster (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/824,352

(22) Filed: Sep. 4, 2024

(65) Prior Publication Data

US 2024/0426446 A1 Dec. 26, 2024

Related U.S. Application Data

(63) Continuation of application No. PCT/EP2022/055891, filed on Mar. 8, 2022.

(51) Int. Cl.

| | |
|---|---|
| ***F21S 41/255*** | (2018.01) |
| ***F21S 41/153*** | (2018.01) |
| ***F21S 41/19*** | (2018.01) |
| ***F21S 41/32*** | (2018.01) |
| ***F21S 41/663*** | (2018.01) |
| ***F21S 45/47*** | (2018.01) |

(52) U.S. Cl.

CPC ........... *F21S 41/255* (2018.01); *F21S 41/153* (2018.01); *F21S 41/19* (2018.01); *F21S 41/321* (2018.01); *F21S 41/663* (2018.01); *F21S 45/47* (2018.01)

(58) Field of Classification Search

CPC ...... F21S 41/255; F21S 41/153; F21S 41/321; F21S 41/663; F21S 45/47; F21S 41/19; F21S 41/148; F21S 41/151; F21S 41/147; F21W 2102/145; F21W 2102/13; F21W 2102/135; B60Q 1/02; B60Q 1/04; G02B 7/021; F21V 5/008

See application file for complete search history.

(56) References Cited

U.S. PATENT DOCUMENTS 8,018,139 B2 * 9/2011 Chou ...................... F21V 29/77
362/249.02
11,168,859 B2 11/2021 Lu et al.
(Continued)

FOREIGN PATENT DOCUMENTS

DE 102017202486 A1 * 8/2017 ............ F21S 41/338
EP 3330599 A1 6/2018
(Continued)

OTHER PUBLICATIONS

Search English translation of WO 2017104678 A1 (Year: 2017).*
Sear English translation of DE 102017202486 A1 (Year: 2017).*

*Primary Examiner* — Omar Rojas Cadima
(74) *Attorney, Agent, or Firm* — Husch Blackwell LLP

(57) ABSTRACT

An illumination device for a vehicle includes at least one light module for producing a light distribution. The light module has at least one light emission unit with at least one light source module. The light module also has at least one reflector unit with at least one reflector element. The light module also has at least one projection unit with at least one lens element. The light emitted from the light emission unit is at least partially coupled into the projection unit via the reflector unit.

17 Claims, 2 Drawing Sheets

(56) References Cited

U.S. PATENT DOCUMENTS

| | | | | |
|---|---|---|---|---|
| 2008/0055896 | A1* | 3/2008 | Feldmeier | F21V 23/0457 362/276 |
| 2010/0033985 | A1* | 2/2010 | Hsu | F21S 41/151 362/539 |
| 2011/0235356 | A1* | 9/2011 | Sato | F21S 41/153 362/519 |
| 2013/0329440 | A1* | 12/2013 | Tsutsumi | H05B 33/02 362/465 |
| 2021/0231279 | A1* | 7/2021 | Ohashi | F21S 41/663 |

FOREIGN PATENT DOCUMENTS

| | | | | |
|---|---|---|---|---|
| EP | 3486557 | A1 | 5/2019 | |
| EP | 3604903 | A1 | 2/2020 | |
| JP | 2019197824 | A | 11/2019 | |
| WO | WO-2017104678 | A1 * | 6/2017 | F21S 41/147 |

* cited by examiner

ILLUMINATION DEVICE FOR A VEHICLE

CROSS REFERENCE

This application claims priority to PCT Application No. PCT/EP2022/055891, filed Mar. 8, 2022, the entirety of which is hereby incorporated by reference.

FIELD OF THE INVENTION

The present invention relates to an illumination device for a vehicle. Further, the present invention relates to a vehicle comprising at least one illumination device.

BACKGROUND OF THE INVENTION

Illumination devices for vehicles, in particular front headlights of cars, fulfill different illumination tasks during vehicle operation. Typical illumination tasks are, for example, the generation of a low-beam light distribution and/or a high-beam light distribution and/or adaptive bend lighting for illumination of the road and adjacent sectors especially in the direction of travel of the vehicle.

These different illumination tasks are commonly fulfilled by separate light modules integrated in a single illumination device each comprising a light source as well as optical elements for light shaping in order to generate a light module specific spatial light distribution on the street. The overall light distribution of the illumination device in a specific driving situation of the vehicle then results from a cumulative overlay of the spatial light distributions generated by the separate light modules. In order to generate a visually harmonious overall light distribution, the spatial light distributions commonly overlap in several boundary areas in a defined manner. Therefore, the position of the separate light modules must be precisely adjusted when illumination devices of such type are assembled and appropriate installation space reserves for adjustments need to be maintained. Also, the combination of multiple separate light modules alone already leads to growing installation space requirements due to increasing part and material quantities needed in a single illumination device.

BRIEF SUMMARY OF THE INVENTION

It is therefore the objective of the present invention to overcome at least one of the aforementioned disadvantages at least partially. In particular, it is the object of the invention to provide an illumination device for a vehicle providing increased illumination functionalities and/or a compact design and/or reduced manufacturing and installation effort and/or decreased manufacturing costs.

The aforementioned task is solved by an illumination device for a vehicle having the features hereof, as well as by a vehicle having the features hereof. Features and details which are described in connection with the illumination device according to the invention also apply in connection with the vehicle according to the invention and vice versa, so that reference is or can always be made mutually with regard to the disclosure concerning the individual aspects of the invention.

According to the invention, an illumination device for a vehicle is provided. The illumination device comprises at least one or exactly one light module for producing a light distribution, wherein the light module comprises at least one light emission unit comprising at least one light source module, at least one reflector unit comprising at least one reflector element and at least one projection unit comprising at least one lens element, wherein the light emitted from the light emission unit is at least partially coupled into the projection unit via the reflector unit.

In other words, the illumination device according to the present invention comprises at least one light module for producing a light distribution wherein the light module comprises at least one light emission unit, at least one reflector unit and at least one projection unit. The light emission unit further comprises at least one light source module, the reflector unit further comprises at least one reflector element providing at least one reflective surface and the projection unit further comprises at least one lens element. According to the invention the light emitted from the light source module is at least partially emitted onto at least one reflective surface of the reflector unit provided by a reflector element of the reflector unit. The light emitted onto the reflector unit is redirected by the reflector unit, preferably by at least one reflector element, and coupled into the projection unit.

According to the invention it is intended, that a part, preferably a main part, of the light emitted from the light emission unit or even all the light emitted from the light emission unit is not directly coupled into the projection unit, but is coupled indirectly into the projection unit via the reflector unit. The reflector unit is used to redirect the light emitted by the light source module of the light emission unit so that it is coupled into the projection unit at a desired position. This means, that a light source module or a light source of said light source module no longer has to be located at the immediate vicinity of the position at which its light is to be coupled into the projection unit. This leads to the advantage, that the mounting position, orientation and size of the light emission unit and/or the mounting position, orientation and size of the light source module of the light emission unit can be decoupled from the mounting position, orientation and size of the projection unit, into which the light emitted by the light emission unit is to be coupled. This again allows for a reduction of the dimensions of the illumination device, in particular with regard to the light module and/or the light emission unit.

The illumination device of the present invention may be used in different types of vehicles. The vehicle may preferably be a car, a truck or a motorcycle. Also, the vehicle may be a working vehicle, in particular an agricultural machine such as a tractor or a rotary mower. A usage of the illumination device according to the invention in or in connection with other types of vehicles is not excluded by the invention. The illumination device of the present invention may be used in vehicles using any type of drive technology such as a common combustion engine, an electrical engine, fuel cells or any hybrid combination of those. Further drive technologies are not excluded from the present invention.

Preferably, the illumination device according to the present invention may be used as a front headlight generating a light distribution in front of the car illuminating the driver's field of vision in the direction of travel. It is also conceivable, that the lighting device is used as a working light, for example on an agricultural machine. However, other installation positions and/or directions of illumination are not excluded by the present invention.

A light source module according to the present invention may preferably comprise at least one light source. Preferably, a light source module may comprise multiple, particularly more than 50, preferably more than 100 or more than 200 light sources. A light source may be a LED (light emitting diode). It may be provided, that all light sources of a light source module are LED's. All LED types may be used in the scope of the present invention. Preferably it may be provided, that at least one light source is a SMD-LED (Surface Mounted Devices-LED) and/or a COB-LED (Chip-on-Board-LED). With the use of COB-LED's particularly compact dimensions of a light source module can be achieved. The usage of SMD-LED's accounts for an efficient and cost-effective production of a light source module.

In the scope of the present invention a reflector element may be of any shape.

Preferably, it may be provided that the at least one reflector element is an at least partially dome-shaped reflector element having at least one light exit opening, wherein the reflector element is positioned such that the at least one light source module and/or at least one light source module is at least partially enclosed by said reflector element. In other words, a reflector element may be at least partially in the form of a dome, the dome being arrangeable or arranged over a light source. The dome may have at least one light exit opening to allow light to exit the dome. It may be provided, that the light exit opening is a planar opening. It may also be provided that the plane defining said light exit opening is inclined with regard, preferably oriented perpendicular or essentially perpendicular, to the main radiation direction of the projection unit and/or parallel or essentially parallel to the main radiation direction of the at least one light source module and/or at least one light source module. The inner surface of the reflector element, preferably of the dome section of the reflector element, may be shaped such that light impinging on the inner surface is reflected from essentially any or any position of the inner surface into the area of and/or through the light exit opening. The reflector element and/or the reflector unit can be shaped in a way such that the dome can be placed flush on a plane. In other words, the reflector element and/or the reflector unit can be shaped in such a way that one edge of the reflector element and/or the reflector unit can be brought to rest at least in part, preferably completely, on a flat surface. The plane/surface can be a plane/surface on/in which a light source module is arranged so that the edge of the reflector element and/or the reflector unit resting on said surface/plane at least partially surrounds the light source module.

In the sense of the present invention a light exit opening of a reflector element may be an opening which remains open when the reflector element is mounted in its desired position. In other words, the reflector element may have further openings or may be designed as an open structure, so that certain openings or sections of the reflector element are covered by other components or parts when the reflector element is mounted in its desired position. In this context, it may be provided, that the reflector element has an opening to allow a placement of the reflector element over a light source or light source module, the opening then being closed by the part (e. g. a printed circuit board or heat-sink body) on which the reflector element is placed.

Preferably a reflector element provides at least one straight or curved surface for deflecting light casted onto the reflector element e. g. by a light emission unit. At least one surface of the reflector element can have at least two sections with different curvature and/or inclination in order to be able to deflect light from different areas of the reflector element in a specific manner. This allows for different radiation angles of the reflector element to be realized in relation to different surface sections. At least a section of the reflector element can be provided with a light-reflecting coating, preferably an Aluminum coating which enables a high reflectance. At least a section of the reflector element may be made from plastic, preferably a thermoplastic, in order to enable easy production and to reduce weight. Additionally, the reflector element may be provided with a protective layer for protection from external effects and maintaining a high degree of functionality. The protective coating may be a transparent silicon coating. Any coating of the reflector element may be achieved by evaporation as this method offers advantages in terms of handling and generation of thin and homogeneous layers.

It may be provided in the scope of the present invention, that a main radiation direction of the light emission unit, preferably of the light source module, is inclined with respect to a main radiation direction of the projection unit, particularly a main radiation direction of the light emission unit is aligned essentially perpendicularly or perpendicularly to a main radiation direction of the projection unit. In other words, a main radiation direction of the light emission unit is oriented non-parallel with respect to a main radiation direction of the projection unit. Preferably it may be provided, that the main radiation direction of the light emission unit and the main radiation direction of the projection unit are oriented essentially perpendicular or perpendicular to each other. An arrangement of this type allows for a compact design of the light module and/or the light emission unit. When arranging the main radiation direction of the light emission unit and the projection unit essentially perpendicular or perpendicular, a particularly compact design may be achieved.

In the sense of the present invention, a main radiation direction is understood to be a main direction of propagation of light. Therefore, with regard to the projection unit, the main radiation direction is defined as the direction from a light entry plane of the projection unit to a light exit plane of the projection unit. From the light exit plane of the projection unit the light propagates into the environment of the illumination device, particularly ahead of the illumination device, e. g. in the direction of a road section ahead of a vehicle producing the desired light distribution.

In the scope of the present invention it may be provided, that the at least one light source module and/or at least one light source module of the light emission unit comprises at least two or more than two, preferably more than 50, especially preferred more than 100 or more than 200 light sources, wherein at least the at least two light sources, preferably all of the light sources, are arranged in a, preferably common, plane. Said plane may be oriented essentially parallel or parallel to the main radiation direction of the projection unit. It may be provided, that a main radiation direction of all light sources arranged in said plane is oriented essentially perpendicular or perpendicular to said plane. With an increasing number of light sources, an increasing flexibility regarding the illumination functionalities of a light module can be achieved. Further, said positioning of the light sources allows for a particularly compact layout of the light source module for a given number of light sources and therefore leads to decreasing dimensions of the light module and/or light emission unit without adverse effects on the coupling of the emitted light into the projection unit due to the intermediate positioning of the reflector unit. Therefore, the number of light sources in a single light source module may be increased significantly without negatively affecting the installation space of a light module, leading to the possibility to combine e. g. different illumination tasks such as low-beam and high-beam illumination in a single light module.

With regard to a typical installation position of the illumination device in a vehicle, the plane in which said light sources of the light source module are arranged may be a horizontal plane. The main radiation direction of the light source module and/or the light sources of the light source module may be essentially perpendicular or perpendicular to said horizontal plane and therefore oriented essentially parallel or parallel to a vertical axis. The plane in which said light sources are arranged can be formed and/or defined by the surface of a printed circuit board on which the light elements are arranged.

In the scope of the present invention it is conceivable that the main radiation direction of the projection unit is directed parallel or essentially parallel to a horizontal axis. This specification refers to an orientation of the illumination device according to the present invention that corresponds to a typical installation position in a vehicle when used as a front head light. Said horizontal axis may be parallel or essentially parallel to a longitudinal axis of the vehicle and/or parallel or essentially parallel to the direction of travel when the vehicle follows a straight road.

In the scope of the present invention it also may be provided, that the main radiation direction of the light emission unit and/or the light source module and/or the light sources of the light emission unit is directed parallel or essentially parallel to a vertical axis. This specification refers to an orientation of the illumination device according to the present invention that corresponds to a typical installation position in a vehicle when used as a front head light. Said vertical axis may be parallel or essentially parallel to a vertical axis of the vehicle oriented perpendicular or essentially perpendicular to the road and/or perpendicular or essentially perpendicular to the direction of travel when the vehicle follows a straight road.

Furthermore, it is conceivable within the scope of the invention that the at least one light source module and/or at least one light source module comprises at least two light sources, wherein each of the light sources can be controlled independently at least with regard to the following functionalities: switching on the light source, switching off the light source, regulating the brightness of the light source.

The control of additional functions is not excluded from the scope of the present invention. An independent control of separate light sources with regard to at least said functionalities has the advantage that the light distribution generated by the light module can be regulated in a particularly flexible manner. For example, by independently controlling the individual light sources of a light source module, the brightness of individual areas of the light distribution generated by the light module can be adapted to prevailing traffic conditions. By way of example, a glare of oncoming traffic can be effectively avoided while a strong illumination of unaffected areas can be maintained and/or specific areas in the driver's field of view such as road markings or road signs can be particularly highlighted. An independent control means, that while controlling at least one of said functionalities for one light source, no other light source is affected in its functionality.

It may be further provided within the scope of the present invention, that the light sources of the at least one light source module and/or at least one light source module are arranged in a matrix structure wherein the matrix structure comprises at least two rows and at least two columns. In this context it may be provided, that the at least one light source module comprises at least two, preferably more than two light sources. The matrix structure may be a rectangular or quadratic matrix structure. Each light source may be located essentially in the center or in the center of an individual cell of said matrix structure. It may be further provided, that all cells of the matrix structure are of the same size. In other words, it can be provided, that the light sources are arranged in equidistant distances to each other with regard to the extension directions of rows and/or columns. The extension directions of rows and columns may be oriented essentially perpendicular or perpendicular to each other. Further it may be provided, that the extension direction of the rows and the extension direction of the columns of said matrix structure span a plane in which the light sources are arranged. Said plane may be oriented essentially parallel or parallel to a main radiation direction of the projection unit. The size of the matrix structure is defined by the respective maximum dimensions with respect to all columns and rows. Therefore, not every cell of the matrix structure has to contain a light source. However, it may of course be provided that each cell of the matrix structure contains a light source. The number of cells of a given matrix structure is the product of the number of columns and the number of rows. The arrangement of the light sources in a matrix structure allows for a simplified generation of desired light distributions as well as for a compact design of the light source module.

In the scope of the present invention, it may be provided that the matrix structure of the at least one light source module and/or at least one light source module comprises at least 3, particularly at least 4, preferably at least 8 or especially preferred at least 10 rows and/or at least 20, particularly at least 50, preferably at least or especially preferred at least 100 columns. The resolution of the light source module increases with an increasing number of rows and/or columns, offering a higher flexibility in order to fulfill different illumination tasks. It may therefore be provided, that the number of rows may be raised to at least 20, preferably at least 30, more preferred at least 50 or more rows and/or at least 150, preferably at least 200, more preferred at least 300 or more columns.

In the scope of the present invention it may further be provided, that the light emitted from the light sources of at least a first row is projected by the projection unit to form a low-beam light distribution and/or the light emitted from the light sources from at least a second row are projected by the projection unit to form a high-beam light distribution. In other words, different rows of the light sources which are arranged in a matrix structure are projected by the projection unit in order to form different types of spatial light distributions, wherein said spatial light distributions form the (overall) light distribution of the light module and/or illumination device as a cumulative combination of said spatial light distributions. This has the advantage that different illumination tasks, which are otherwise performed by separate light modules, can now be performed by a single light module. As the number of separate light modules may therefore be reduced, the installation space as well as the unit costs of a single illumination device may be decreased. Also, there is no need for error-prone adjustment of different light modules in their relative positions to each other in order to generate a homogenous light distribution. In this context, it may further be provided that the reflector element is shaped in such a way that the light emitted from each light source is reflected to a specifically determined position on the light entrance plane of the projection unit, wherein from there the light is projected into the desired spatial light distribution.

In the sense of the present invention, a low-beam light distribution may be a light distribution in an area extending in a range from 0 m to 100 m, preferably in front of the illumination device. A high-beam light distribution may be a light distribution extending from the end of the range of a low-beam light distribution away from the illumination device and/or a vehicle.

Within the scope of the present invention it is further conceivable, that the light emitted by each light source of the at least one light source module and/or at least one light source module is projected into an individual projection sector by the projection unit, wherein the projection sector is a partial sector of the light distribution produced by the light module. In other words, the light of each of a plurality of light sources of a light source module is projected into an area in front of the illumination device by the projection unit in order to produce a light distribution (e. g. onto a street when the illumination device is installed in a vehicle), wherein the emitted light of each light source is projected into an individual projection sector forming a partial sector of said light distribution. By assigning each light source to a defined projection sector within the light distribution, a simple and flexible adjustment of the light distribution to existing traffic conditions can be made. Also, the light distribution can be flexibly adapted to special conditions such as right-hand or left-hand traffic, without any need for constructive changes in the illumination device. In this context, it may further be provided that the reflector element is shaped in such a way that the light emitted from each light source is reflected to a specific position on the light entrance plane of the projection unit, wherein from there the light is projected into the projection sector by the projection unit.

The resolution of the light distribution in the sense that each projection sector represents a light pixel within the light distribution results directly from the number of light sources arranged in said light source module. Accordingly, by increasing the number of light sources in said light source module, the resolution and thereby the flexibility regarding a traffic dependent adjustment of the light distribution produced by the light module can be increased. It may be provided, that at least two projection sectors overlap along at least a section of at least one edge of said projection sectors. This achieves the advantage of a particularly homogeneous and uniform light distribution. It may also be provided that each projection sector is free from any overlap with other projection sectors in at least one area of that projection sector, in particular a central area in each projection sector may be free from any overlap with other projection sectors.

In the scope of the present invention it may be provided, that the light emission unit comprises a printed circuit board, wherein the at least one light source module and/or at least one light source module is arranged on the printed circuit board and wherein preferably at least one edge of the at least one light source module is at least partially aligned with an edge of the printed circuit board. Further it may be provided, that the at least partially aligned edges of the printed circuit board and the light source module are at least partially arranged in opposite to the projection unit, preferably opposite to the light entry plane of the projection unit. In other words, it may be provided that at least one light source module is arranged on a printed circuit board, the light source module being arranged immediately adjacent to an edge of the printed circuit board so that an edge of the light source module and an edge of the printed circuit board are arranged in cover, at least along a section of the edge of the circuit board and/or light source module. This offers the advantage that the edge of the printed circuit board does not interfere with the projection of the light emitted by the light source module and thus a uniform light distribution can be generated. It may further be provided, that multiple edges, preferably two, three or four, of the at least one light source module and/or at least one light source module are at least partially aligned with an edge of the printed circuit board. In this way, the above-mentioned effect can also be realized with respect to other edges.

The light source module may be arranged on the printed circuit board by means of a substance-to-substance bonding such as a solder joint which accounts for a particularly durable connection. Also, it is possible, that the light source module is arranged on the printed circuit board via a friction-locked or form-fit connection like a plug-in connection or a clips-connection, which allows for an easy exchange of the light source module.

In the scope of the present invention it is further conceivable, that the at least one reflector element and/or at least one reflector element is at least partially arranged on the same side of the printed circuit board as the at least one light source module and/or at least one light module and encloses the at least one light source module and/or at least one light source module at least in sections. In this context it may be provided, that at least one reflector element and/or the reflector unit is at least partially arranged on the printed circuit board and/or on a heat-sink body of the light emission unit. In this context it may further be provided that the reflector element rests with one edge at least partially on the printed circuit board and/or the heat-sink body, the edge at least partially surrounding the at least one and/or at least one light source module and/or the printed circuit board. This prevents unwanted light from escaping into the environment and allows the light emitted by the light source module to be used effectively. It may further be provided that the reflector unit and heat-sink body enclose the printed circuit board. The reflector element and/or the reflector unit may be connected with the heat-sink body and/or the printed circuit board by means of a substance-to-substance connection such as an adhesive connection, a force-fit connection such as a screw connection or a form-fit connection such as a clips connection. In this context, an adhesive connection offers a simple attachment. A screw connection offers the advantage of a particularly durable connection and a clips connection offers the advantage of a simple exchange of the reflector element and/or reflector unit.

Further, it may be provided that the light emission unit comprises at least one heat-sink body in order to enable an efficient transfer of the heat generated by the light source module to the environment and to avoid an overheating of the light module or specific components thereof. The heat-sink body may at least partially be arranged on and/or at least partially in contact with a printed circuit board. At least one cooling fin may be formed on the heat-sink body in order to increase the efficiency of heat dissipation by increasing the surface area of the heat-sink body. It may be provided that the at least one light source and/or at least one light source module and at least one heat-sink body are arranged on opposite sides of the same printed circuit board in direct proximity and/or opposite of each other. It is also conceivable within the scope of the invention that at least one printed circuit board, has at least one through-plating which acts as a thermal bridge. At least one through-plating may be located in the immediate vicinity of a light source module or under a light source module. This offers the advantage, that the effectiveness of the heat transport from the light source module to the heat-sink body can be increased.

In the scope of the present invention it is conceivable, that at least one lens element of the at least one projection unit is a rotationally symmetrical, preferably spherical or aspherical, collimator lens element. This has the advantage that the light beams that are coupled into the projection unit are at least partially aligned parallel along a main radiation direction of the projection unit and any downstream light shaping is simplified. A rotationally symmetrical design of the lens results in the advantage of a symmetrical light image of the lens.

It is also conceivable within the scope of the invention that at least one lens element of the at least one projection unit and/or at least one projection unit is made at least in sections of glass and/or a polymer and/or a silicone. With respect to the use of glass, the advantage of a high resistance against superficial damages (e.g. scratches) results. With respect to the use of a polymer, the advantage of a particularly low-cost production results. With regard to the use of a silicone, there is the advantage of a particularly low weight.

Further it may be provided in the scope of the present invention, that at least one lens element of the projection unit is a plano-convex lens element. In particular, it may be provided that the at least one plano-convex lens element and/or at least one plano-convex lens element is arranged behind at least one collimator lens element of the projection unit with respect to a main radiation direction of the projection unit. In other words, the at least one plano-convex lens element and at least may be arranged in a serial manner, wherein the at least one plano-convex lens element is arranged behind the collimator lens element with regard to a main radiation direction of the projection unit. By using a plano-convex lens element, the light entering the projection unit can be shaped according to a desired light distribution and the individual illumination sectors generated by projection of separate light sources can be adjusted in size as desired.

In the scope of the present invention it is further conceivable, that the projection unit comprises at least three lens elements, whereby the lens elements are arranged in a serial manner with regard to a main radiation direction of the projection unit. This increases the flexibility with regard to the light shaping of the projection unit. Preferably it may be provided that one lens element of the at least three lens elements is a collimator lens element and/or at least one lens element of the at least three lens elements is a plano-convex lens element. Also, it is conceivable, that the collimator lens element is the first lens element with respect to the serial arrangement of the at least three lens elements. In the scope of the present invention it is conceivable, that two lens elements of the at least three lens elements are plano-convex lens elements. In this context it may be provided, that the planar sides of the two plano-convex lens elements are arranged opposite to each other. In other words, it may be provided that the two plano-convex lens elements are arranged in a manner, such that light emerging from the planar side of a first plano-convex lens element is coupled into the planar side of the second lens element. Hereby a particularly advantageous light shaping can be achieved by the projection unit. An arrangement in a serial manner means, that the light or the light rays do not enter said lens elements simultaneously and/or independently of each other but enters one lens element after another, starting from a first lens element.

It may be provided in the scope of the present invention, that the low-beam light distribution produced by the light module is supplemented and/or at least partially overlapped by a pre-field light distribution. In this context it is conceivable, that the low-beam light distribution produced by the light module according to this invention is a light distribution in an area extending in a range from >0 m to 100 m, particularly >20 m to 100 m or ≥40 m to 100 m in front of the illumination device. Also, it is conceivable, that the pre-field light distribution is a light distribution extending in a range from 0 m to 10 m, preferably 0 m to 20 m or 0 m to ≤40 m, preferably 0 m to <50 m. In other words, a range in front of the illumination device, preferably between the low-beam light distribution generated by the light module and the illumination device, which is not covered by the low-beam light distribution of the light module is covered by the pre-field light distribution. It may be further provided, that the pre-field light distribution and the low-beam light-distribution generated by the light module at least partially overlap in order to produce a smooth overall light distribution.

The pre-field light distribution may be produced by an additional light module comprised by the illumination device. The additional light module may be a light module according to the present invention. However, it is also conceivable within the scope of the present invention, that the pre-field light distribution is also generated by the light-module according to the present invention.

Furthermore, the above task is solved by a vehicle comprising at least one illumination device according to the present invention. With respect to the vehicle, the same advantages arise as have been described with respect to the illumination device.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
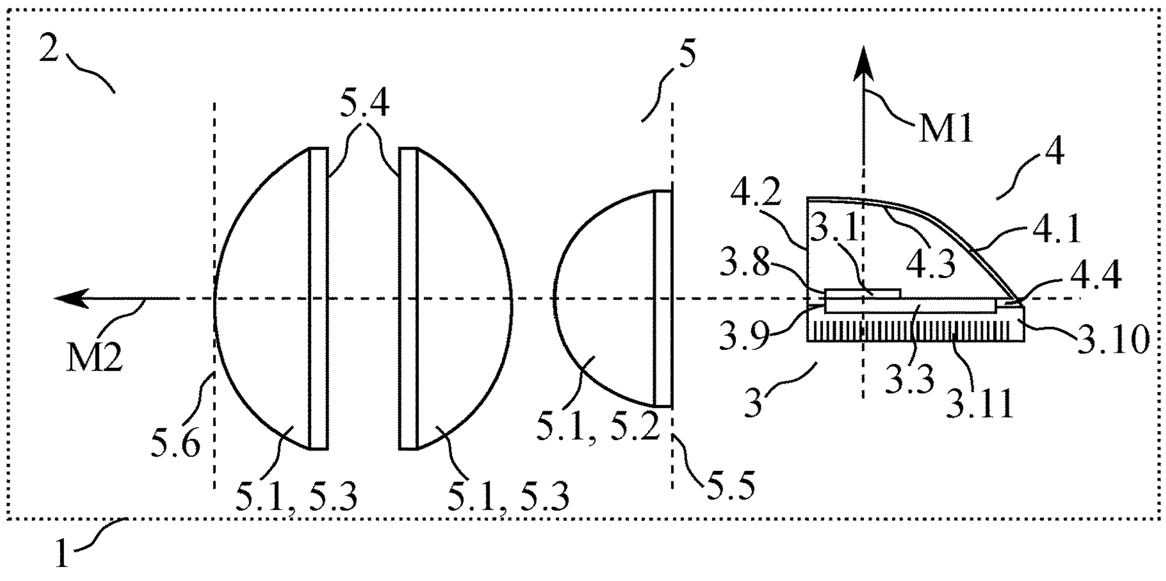
FIG. 1 shows a schematic representation of an illumination device according to the invention.

FIG. 1 shows a schematic representation of an illumination device 1 according to the invention. The illumination device 1 comprises at least one light module 2. The light module 3 comprises a light emission unit 3, a reflector unit 4 and a projection unit 5 wherein the light emission unit 3 comprises a light source module 3.1, the reflector unit 4 comprises a reflector element 4.1 and the projection unit 5 comprises a plurality of lens elements 5.1. The light emitted from the light emission unit 3 is at least partially coupled into the projection unit 5 via the reflector unit 4, respectively via the reflector element 4.1.

As can be seen from FIG. 1, the light source module 3.1 emits light along a main radiation direction M1. The light is emitted onto the inner surface 4.3 of the reflector element 4.1. The reflector element 4.1 redirects the light in direction of the light entry plane 5.5 of the projection unit 5. Via said light entry plane 5.5 the light is coupled into the projection unit 5, respectively into the first lens element 5.1 of the projection unit 5.

The light coupled into the projection unit 5 propagates along the main radiation direction M2 of the projection unit 5, is shaped by at least one lens element 5.1 of the projection unit 5 and finally projected into the environment in order to produce a desired light distribution 10. The light distribution 10 may be a light distribution 10 on a street, as the illumination device 1 may be used as a front headlight of a vehicle 100.

Thus, at least a part of the light emitted from the light emission unit 3, respectively emitted from the light source module 3.1, is coupled indirectly into the projection unit 5 via the reflector unit 4. The reflector unit 4 and/or the reflector element 4.1 is used to redirect the light emitted by the light source module 3.1 of the light emission unit 3 so that it is coupled into the projection unit 5 at a desired position on the light entry plane 5.5. This means, that a light source module 3.1 or a light source 3.2 of said light source module 3.1 no longer has to be located at the immediate vicinity of the position at which its light is to be coupled into the projection unit 5. This leads to the advantage, that the mounting position, orientation and size of the light emission unit 3 and/or the mounting position, orientation and size of the light source module 3.1 of the light emission unit 3 can be decoupled from the mounting position, orientation and size of the projection unit 5, into which the light emitted by the light emission unit 3 is to be coupled. This again allows for a reduction of the dimensions of the illumination device 1, in particular with regard to the light module 2 and/or the light emission unit 3.

As shown in FIG. 1, the main radiation direction M1 of the light emission unit 3, respectively the light source module 3.1 is inclined with respect to the main radiation direction M2 of the projection unit 5. In the embodiment shown in FIG. 1, the main radiation direction M1 of the light emission unit 3 and/or the light source module 3.1 is aligned essentially perpendicular to the main radiation direction M2 of the projection unit 5. An arrangement of this type allows for a preferably compact design of the light source module 3.1 and/or the light emission unit 3.

The light emission unit 3 further comprises a printed circuit board 3.3, wherein the light source module 3.1 is arranged on said printed circuit board 3.3 in a manner such that at least one edge 3.8 of the light source module 3.1 is at least partially aligned with an edge 3.9 of the printed circuit board 3.3. The at least partially aligned edges 3.8, 3.9 of the printed circuit board 3.3 and the light source module 3.1 are at least partially arranged in opposite to the projection unit 5 and/or opposite to the light entry plane 5.5 of the projection unit 5. This offers the advantage that the edge 3.8 of the printed circuit board 3.3 does not interfere with the projection of the light emitted by the light source module 3.1 and thus a uniform light distribution 10 can be generated.

The light emission unit 3 further comprises a heat-sink body 3.10 in order to enable an efficient transfer of the heat generated by the light source module 3.1 to the environment in order to avoid an overheating of the light source module 3.1. The heat-sink body 3.10 is at least partially arranged on the printed circuit board 3.3 and comprises a plurality of cooling fins 3.11 in order to increase the heat dissipation efficiency. The light source module 3.1 and the heat-sink body 3.10 are arranged on opposite sides of the circuit board 3.3 opposite from each other.

The reflector element 4.1 is arranged on the same side of the printed circuit board 3.3 as the light source module 3.1 and encloses the light source module 3.1 at least partially. The reflector element 4.1 is at least partially arranged on the heat-sink body 3.10. Therefore, an edge 4.4 of the reflector element 4.1 rests at least partially on the heat-sink body 3.10, the edge at least partially surrounding the light source module 3.1 and/or the printed circuit board 3.3. This prevents unwanted light from escaping into the environment and allows the light emitted by the light source module 3.1 to be used effectively.

The reflector element 4.1 is at least partially dome-shaped reflector element 4.1 having a light exit opening 4.2. The reflector element 4.1 is positioned such that the light source module 3.1 is at least partially enclosed by said reflector element 4.1. The plane defining said light exit opening 4.2 is oriented essentially perpendicular or perpendicular to the main radiation direction M2 of the projection unit and oriented essentially parallel or parallel to the main radiation direction M1 of the light source module 3.1. The inner surface 4.3 of the reflector element 4.1, preferably of the dome section of the reflector element 4.1, may be shaped such that light impinging on the inner surface 4.3 is reflected from essentially any or any position of the inner surface 4.3 into the area of and/or through the light exit opening 4.2.

As can be seen from FIG. 1, the projection unit 5 comprises three lens elements 5.1, whereby the lens elements 5.1 are arranged in a serial manner with regard to the main radiation direction M2 of the projection unit 5. One of the three lens elements 5.1 is a rotationally symmetrical, preferably spherical or aspherical, collimator lens element 5.2. The remaining two lens elements 5.1 are both plano-convex lens elements 5.3. The collimator lens element 5.2 is the first lens element 5.1 with respect to the serial arrangement of three lens elements 5.1 with regard to the main radiation direction M2 of the projection unit 5. Further, the planar sides 5.4 of the two plano-convex lens elements 5.3 are arranged opposite to each other. By such an arrangement of lens elements 5.1, a particularly advantageous light shaping and projection can be achieved by the projection unit.

Figure 2:
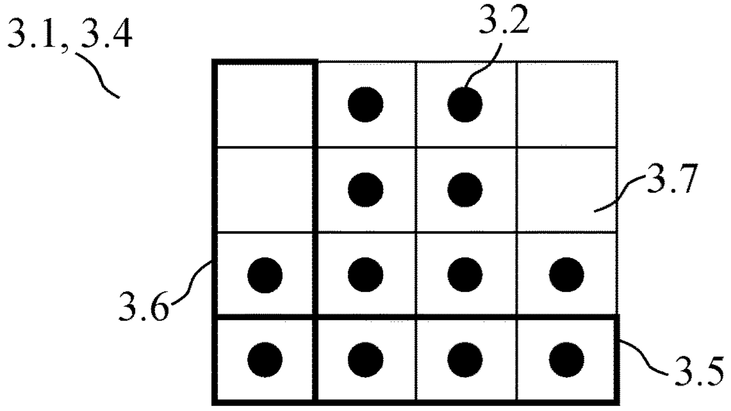
FIG. 2 schematically shows the structure of a light source module according to the invention.

FIG. 2 schematically shows the structure of a light source module 3.1 according to the invention. The viewing direction in FIG. 2 is oriented opposite to the main radiation direction M1 with respect to FIG. 1. Accordingly, a top view of the light source module 3.1 is shown. As can be seen, from FIG. 2, the light source module 3.1 comprises a plurality of light sources 3.2 which are arranged in a common plane. The plane is defined by the extension directions of the rows 3.5 and columns 3.6. As can be seen from FIG. 1, said plane is oriented essentially parallel or parallel to the main radiation direction M2 of the projection unit 5 and/or essentially perpendicular or perpendicular to the main radiation direction M1 of the light emission unit 3 and/or the light source module 3.1.

Each of the light sources 3.2 of the plurality of light sources 3.2 of the light source module 3.1 can be controlled independently at least with regard to the following functionalities:

Switching on the light source,

Switching off the light source,

Regulating the brightness of the light source.

An independent control of separate light sources 3.2 with regard to at least said functionalities has the advantage that the light distribution 10 generated by the light module 2 can be regulated in a particularly flexible manner.

As can be seen from FIG. 2, the light sources 3.2 of the light source module 3.1 are arranged in a matrix structure 3.4. In the embodiment shown in FIG. 1, the matrix structure 3.4 comprises four rows 3.5 and four columns 3.6. The extension directions of rows 3.5 and columns 3.6 are oriented essentially perpendicular or perpendicular to each other, leading to a quadratic or rectangular matrix structure. Each light source 3.2 of the light source module 3.1 is located essentially in the center of an individual cell 3.7 of said matrix structure 3.4 and are therefore arranged in equidistant distances to each other with regard to the extension directions of rows 3.5 and columns 3.6.

Not every cell 3.7 of the matrix structure 3.4 contains a light source 3.2. The number of cells 3.7 of a given matrix structure 3.4 is the product of the number of columns and the number of rows. With regard to the embodiment shown in FIG. 2, the number of cells is therefore sixteen. The arrangement of the light sources 3.2 in a matrix structure 3.4 allows for a simplified generation of desired light distributions 10 as well as for a compact design of the light source module 3.1.

Figure 3:
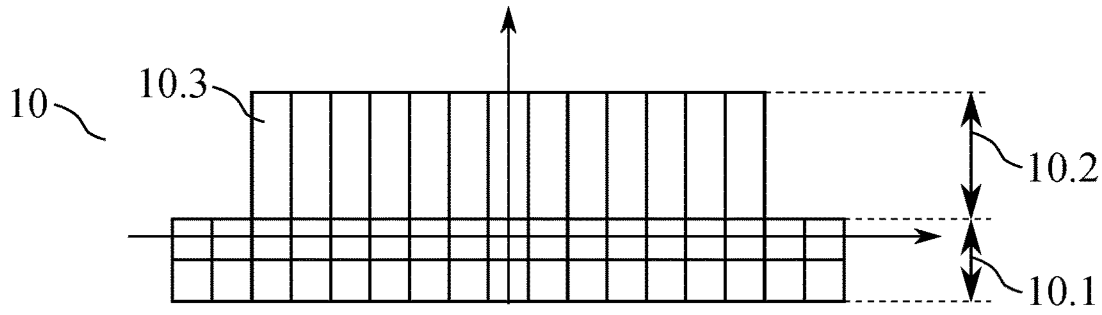
FIG. 3 shows a schematic light distribution produced by an illumination device and/or light module according to the invention.

FIG. 3 shows a schematic light distribution 10 produced by an illumination device 1 and/or light module 2 according to the invention using a light source module 3.1 of the type described with reference to FIG. 2. As FIG. 2 is only a schematic illustration of the general structure of said light source module 3.1 and FIG. 3 is only a schematic illustration of a light distribution 10, the number of light sources 3.2 shown in FIG. 2 and the number of projection sectors 10.3 may differ.

With respect to FIG. 3, the light emitted from the light sources 3.2 of at least a first row 3.5 (with regard to FIG. 2, for example, the light of the two lower rows 3.5) is projected by the projection unit 5 to form a low-beam light distribution 10.1 and the light emitted from light sources 3.2 of at least a second row 3.5 (with regard to FIG. 2, for example, the light of the two upper rows) is projected by the projection unit 5 to form a high-beam light distribution 10.2. In other words, different rows 3.5 of light sources 3.2 which are arranged in a matrix structure 3.4 are projected by the projection unit 5 in order to form different types of spatial light distributions (low-beam and high-beam light distributions 10.1, 10.2), wherein said spatial light distributions 101, 10.2 form the (overall) light distribution 10 of the light module 2 and/or illumination device 1 as a cumulative combination of said spatial light distributions 10.1, 10.2. This has the advantage that different illumination tasks, which are otherwise performed by separate light modules 2, can now be performed by a single light module 2.

As also shown in FIG. 3, the light of each light source 3.2 of the light source module 3.1 is projected into an individual projection sector 10.3 by the projection unit 5, wherein the projection sector 10.3 is a partial sector of the light distribution 10 produced by the light module 2. By assigning each light source 3.2 to a defined projection sector 10.3 within the light distribution 10, a simple and flexible adjustment of the light distribution 10 to existing traffic conditions can be made. The resolution of the light distribution 10 in the sense that each projection sector 10.3 represents a light pixel within the light distribution 10 results directly from the number of light sources 3.2 arranged in said light source module 3.1. Accordingly, by increasing the number of light sources 3.2 in said light source module 3.1, the resolution and thereby the flexibility regarding a traffic dependent adjustment of the light distribution 10 produced by the light module 2 can be increased.

Figure 4:
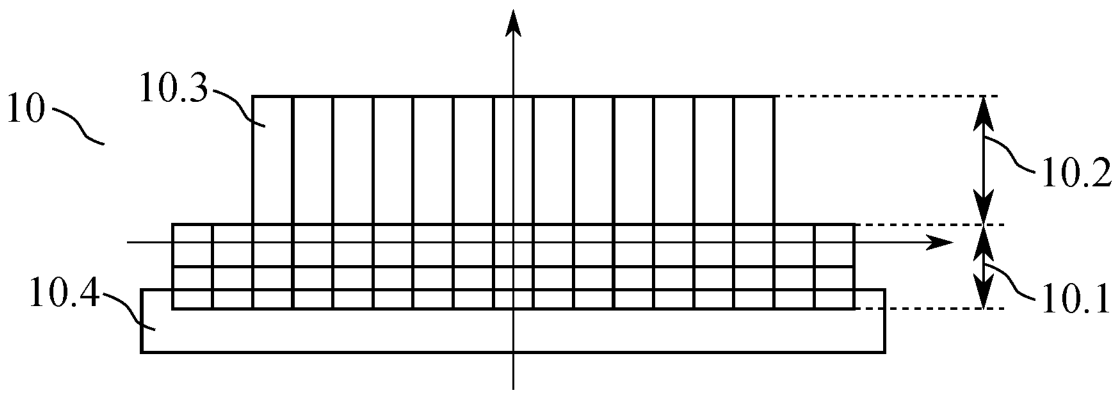
FIG. 4 shows a schematic light distribution produced by an illumination device and/or light module according to the invention.

FIG. 4 shows a schematic light distribution 10 produced by an illumination device 1 and/or light module 2 according to the invention wherein the low-beam light distribution 10.1 is supplemented and at least partially overlapped by a pre-field light distribution 10.4, wherein the pre-field light distribution 10.4 covers a range in front of the illumination device 1, preferably between the illumination device and the low-beam light distribution 10.1, which is not covered by the low-beam light-distribution 10.1.

Figure 5:
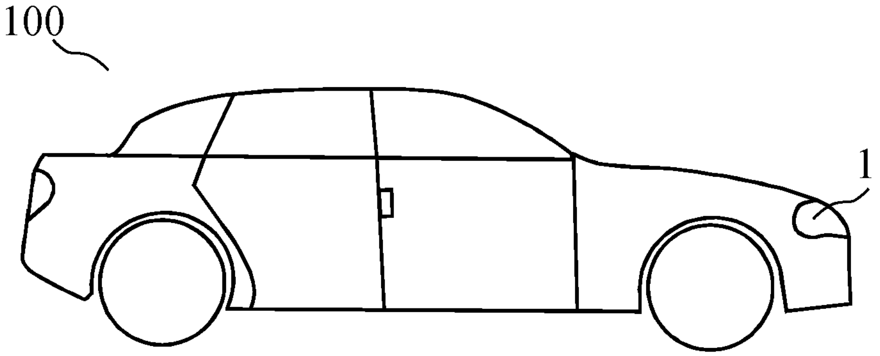
FIG. 5 shows a schematic representation of a vehicle according to the invention.

FIG. 5 shows a schematic representation of a vehicle 100 according to the invention. The vehicle 100 comprises at least one, preferably at least two or exactly two illumination devices 1 according to the present invention. With respect to the vehicle 100, the same advantages arise as have been described with respect to the illumination device 1.

LIST OF REFERENCE SIGNS

1 Illumination device
2 Light module
3 Light emission unit
3.1 Light source module
3.2 Light source
3.3 Printed circuit board
3.4 Matrix structure
3.5 Row
3.6 Column
3.7 Cell
3.8 Edge of a light source module
3.9 Edge of a printed circuit board
3.10 Heat-sink body
3.11 Cooling fin
4 Reflector unit
4.1 Reflector element
4.2 Light exit opening
4.3 Inner surface of reflector element
4.4 Edge of reflector element
5 Projection unit
5.1 Lens element
5.2 Collimator lens element
5.3 Plano-convex lens element
5.4 Plan surface of plano-convex lens element
5.5 Light entry plane
5.6 Light exit plane
10 Light distribution
10.1 Low-beam light distribution
10.2 High-beam light distribution
10.3 Projection sector
10.4 Pre-field light distribution
100 Vehicle
M1 Main radiation direction of the light emission unit
M2 Main radiation direction of the projection unit

We claim:

1. An illumination device for a vehicle, the illumination device comprising:
- at least one light module for producing a light distribution, the at least one light module including:
  - at least one light emission unit with at least one light source module,
  - at least one reflector unit with at least one reflector element, and
  - at least one projection unit including at least three lens elements, wherein the at least three lens elements are arranged in a serial manner with regard to a main radiation direction (M2) of the at least one projection unit,
- wherein light emitted from the at least one light emission unit is at least partially coupled into the at least one projection unit via the at least one reflector unit, wherein a main radiation direction (M1) of the at least one light emission unit is inclined with respect to the main radiation direction (M2) of the at least one projection unit, wherein the at least one reflector element is an at least partially dome-shaped reflector element having a light exit opening, the at least one reflector element defining an inner surface having a first surface section and a second surface section, the at least one reflector element positioned such that the at least one light source module is at least partially enclosed by the first surface section, wherein the first surface section has a different curvature and/or a different inclination from the second surface section, and wherein the light exit opening is oriented essentially perpendicular to the main radiation direction (M2) of the at least one projection unit.

2. The illumination device according to claim 1, wherein one of the at least three lens elements is a collimator lens element and two of the at least three lens elements are plano-convex lens elements.

3. The illumination device according to claim 1, wherein the at least one light source module includes at least two light sources, wherein at least the at least two light sources are arranged in a plane, wherein the plane is oriented essentially parallel to the main radiation direction (M2) of the at least one projection unit.

4. The illumination device according to claim 1, wherein the at least one light source module includes at least two light sources, wherein at least one of the following functionalities may be controlled independently for each of the at least two light sources:

switching on the light source, switching off the light source, or regulating a brightness of the light source.

5. The illumination device according to claim 1, wherein the at least one light source module includes at least two light sources arranged in a matrix structure, wherein the matrix structure has at least two rows and at least two columns, and wherein each light source is located essentially in a center of an individual cell of said matrix structure.

6. The illumination device according to claim 5, wherein light emitted from the light sources of at least a first row are projected by the at least one projection unit to form a low-beam light distribution and light emitted from the light sources of at least a second row are projected by the at least one projection unit to form a high-beam light distribution.

7. The illumination device according to claim 1, wherein the at least one light source module includes at least two light sources, and light emitted by each light source of the at least one light source module is projected into an individual projection sector by the at least one projection unit, wherein the projection sector is a partial sector of the light distribution produced by the at least one light module.

8. The illumination device according to claim 2, wherein planar sides of the plano-convex lens elements are arranged opposite to each other.

9. The illumination device according to claim 1, wherein the at least one light emission unit includes a printed circuit board, wherein the at least one light source module is arranged on the printed circuit board and wherein at least one edge of the at least one light source module is at least partially aligned with an edge of the printed circuit board.

10. The illumination device according to claim 9, wherein the at least one reflector element is at least partially arranged on a same side of the printed circuit board as the at least one light source module.

11. The illumination device according to claim 9, wherein the at least one light emission unit includes at least one heat-sink body which is at least partially arranged on the printed circuit board opposite to the at least one light source module.

12. The illumination device according to claim 1, wherein one of the at least three lens elements of the at least one projection unit is a rotationally symmetrical collimator lens element.

13. The illumination device according to claim 12, wherein one of the at least three lens elements of the at least one projection unit is a spherical or aspherical collimator lens element.

14. The illumination device according to claim 1, wherein one of the at least three lens elements of the at least one projection unit is a plano-convex lens element.

15. A vehicle comprising at least one illumination device according to claim 1.

16. The illumination device according to claim 1, wherein the main radiation direction (M1) of the at least one light emission unit is aligned essentially perpendicular to the main radiation direction (M2) of the at least one projection unit.

17. The illumination device according to claim 1, wherein the inner surface of the at least one reflector element is shaped such that light impinging on the inner surface is reflected from essentially any position of the inner surface into the light exit opening.

* * * * *